(12) United States Patent
Wu et al.

(10) Patent No.: US 12,404,432 B2
(45) Date of Patent: Sep. 2, 2025

(54) WATERBORNE ADHESIVE COMPOSITION

(71) Applicant: Dow Global Technologies LLC, Midland, MI (US)

(72) Inventors: Jie Wu, Lake Jackson, TX (US); Viraj K. Shah, Pearland, TX (US); Kalyan Sehanobish, Sanford, MI (US)

(73) Assignee: Arkema France, Puteaux (FR)

( * ) Notice: Subject to any disclaimer, the term of this patent is extended or adjusted under 35 U.S.C. 154(b) by 321 days.

(21) Appl. No.: 18/042,631

(22) PCT Filed: Aug. 17, 2021

(86) PCT No.: PCT/US2021/046278
§ 371 (c)(1),
(2) Date: Feb. 23, 2023

(87) PCT Pub. No.: WO2022/066319
PCT Pub. Date: Mar. 31, 2022

(65) Prior Publication Data
US 2023/0332023 A1    Oct. 19, 2023

Related U.S. Application Data

(60) Provisional application No. 63/081,968, filed on Sep. 23, 2020.

(51) Int. Cl.
*C09J 133/08* (2006.01)
*C09J 11/06* (2006.01)
*C09J 11/08* (2006.01)

(52) U.S. Cl.
CPC ............. *C09J 133/08* (2013.01); *C09J 11/06* (2013.01); *C09J 11/08* (2013.01); *C09J 2301/312* (2020.08); *C09J 2301/50* (2020.08); *Y10T 428/24* (2015.01)

(58) Field of Classification Search
CPC . C09J 133/08; C09J 11/06; C09J 11/08; C09J 2301/312; C09J 2301/50; Y10T 428/24
See application file for complete search history.

(56) References Cited

U.S. PATENT DOCUMENTS

| | | |
|---|---|---|
| 6,589,384 B2 | 7/2003 | Chen et al. |
| 8,716,402 B2 | 5/2014 | Temple et al. |
| 9,200,179 B2 | 12/2015 | Uchida |
| 2005/0228096 A1 | 10/2005 | Kirsten et al. |
| 2013/0017400 A1 | 1/2013 | Imai et al. |
| 2013/0029772 A1 | 1/2013 | Dao et al. |
| 2016/0130056 A1 | 5/2016 | Nishijima et al. |
| 2016/0230046 A1 | 8/2016 | Vinci et al. |
| 2017/0283669 A1* | 10/2017 | Lipscomb ......... C08F 220/1804 |

FOREIGN PATENT DOCUMENTS

CN    107799702 A    3/2018

* cited by examiner

*Primary Examiner* — Donald M Flores, Jr.
(74) *Attorney, Agent, or Firm* — Boyle Fredrickson S.C.

(57) ABSTRACT

A waterborne laminating barrier adhesive composition including: (a) a water-based acrylic polymer emulsion component having a Tg of above −20 C; (b) at least one nanocellulose component comprising fibers and/or crystals having a length/width ratio of from 10 to 1,000; and (c) optionally, at least one isocyanate crosslinker component; a process for preparing the above waterborne laminating barrier adhesive composition; and a laminate structure made using the above waterborne laminating barrier adhesive composition.

10 Claims, No Drawings

WATERBORNE ADHESIVE COMPOSITION

FIELD

The present invention relates to a water-borne adhesive composition; and more specifically, the present invention relates to a water-borne laminating adhesive composition that is useful for laminating two films together via a lamination process, that advantageously exhibits enhanced oxygen and water barrier properties, and that is useful for flexible packaging applications.

BACKGROUND

Laminating adhesives are used to bond different substrates together for flexible food packaging applications. Typically, the flexible packaging requires good clarity, high peel strength, resistance to tunneling, and good barrier performance to help keep the package intact and food safe/secure. Recently, adhesives with good barrier properties have been demanded in the market for reducing oxygen permeability of food packages. Reducing oxygen permeability of food packages could potentially simplify packaging structures for such food packages, reduce cost-in-use, and make the package recyclable. Heretofore, barrier adhesive formulations that provide an increase in barrier performance is mainly based on either: (1) adding inorganic particles in the formulation or (2) using a crystalline polymer in the formulation. Each of the above approaches increase the barrier performance of formed laminate structures, but each approach has its own constraints. For example, inorganic particles tend to settle down in the formulation and cause cylinder clogging issues from an application point of view. The crystalline polymer approach has solvent concerns and high environmental impact, not aligned with the megatrend of switching from solvent-borne to waterborne or solventless adhesives.

Waterborne adhesives are widely used in general and up to medium performance food packaging applications in part due to waterborne adhesives' low environmental impact, low cost, and ease of handling. The known acrylic emulsion-based adhesive system exhibits good adhesion to a wide range of structures and is compliant with government regulations. However, water-based adhesives usually do not have good barrier performance. It is therefore desired to provide a water-borne emulsion-based laminating adhesive formulation with enhanced oxygen barrier performance such that the water-borne laminating adhesive formulation can be advantageously used in flexible packaging applications.

SUMMARY

The present invention is directed to a waterborne (or solventless or solvent-free) adhesive composition (herein abbreviated "WAC") for use in a lamination process for laminating two films together to form a multilayer laminate structure.

In one embodiment, the WAC of the present invention includes an acrylic emulsion-based adhesive composition and a predetermined sufficient amount of nanocellulose ingredient or additive such that, when the WAC containing the nanocellulose additive is used to prepare a laminate, the oxygen barrier performance of the laminate is increased compared to a laminate prepared from a standard adhesive formulation without containing the nanocellulose additive.

In a preferred embodiment, the WAC of the present invention is waterborne laminating barrier adhesive composition including: (a) a water-based acrylic polymer emulsion component having a glass transition temperature (Tg) of above −20 degrees Celsius (° C.); (b) at least one nanocellulose component comprising fibers and/or crystals having a width of from 2 nanometers (nm) to 25 nm and having a length/width ratio of from 10 to 1,000; and (c) optionally, at least one isocyanate crosslinker component.

In other embodiments, the present invention includes a laminate structure prepared using the above WAC and a process of forming the laminate using the WAC of the present invention.

Advantageously, the present invention WAC can readily cover metalized laminate structures with an enhanced oxygen barrier performance compared to previously known conventional adhesive formulations.

DETAILED DESCRIPTION

In one broad embodiment, the present invention is directed to a WAC for producing a laminate, the WAC including (a) an aqueous acrylic emulsion-based component; (b) at least one water-based nanocellulose component; and (c) optionally, at least one crosslinker component. The unique WAC of the present invention advantageously has good barrier performance; for making a multilayer laminate having good barrier properties which are properties suitably imparted onto a packaging article made from the laminate. Generally, the adhesive composition, WAC, is used to bond at least two film substrates together to form a composite multilayer laminate structure. In the lamination process, the WAC is disposed inbetween the two film substrate layers by applying the adhesive to at least one of the substrate layers and then contacting the two substrates together. The adhesive is then cured to bond the two substrate layers together.

The aqueous acrylic emulsion-based component, component (a) useful in the present invention, is a water-based or aqueous acrylic polymer emulsion that is made with processes well known in the art of polymer emulsions including, for example, free radical polymerization of acrylic monomers in water. The monomers used to make the emulsion can include, for example, vinyl acetate, methyl acrylate, methyl methacrylate, butyl acrylate, ethyl acrylate, acrylic acid, methacrylic acid, hydroxyethyl acrylate, hydroxypropyl acrylate, N-hydroxymethyl acrylamide, 2-ethylhexyl acrylate, styrene, and mixtures thereof.

As used herein, an "aqueous" acrylic polymer emulsion is an emulsion that is liquid at 25° C. and contains 3 percent (%) or more water as the continuous fluid medium by weight based on the weight of the emulsion in one embodiment, 50% or higher in another embodiment, 60% or higher in still another embodiment, and 70% or higher in yet another embodiment. The polymer that is contained in the aqueous medium is distributed/dispersed throughout the aqueous medium as discreet droplets or particles in the aqueous medium.

The aqueous acrylic polymer emulsion useful in the present invention has polymer particles finely dispersed in water wherein the size of the polymer particles can range from 50 nm to 1,000 nm (0.05 micron [μm] to 1.0 μm). The aqueous acrylic polymer emulsion also has a high molecular weight, for example, in the range of from 500,000 to 1,000,000 in one embodiment. The emulsion has a high shear resistance, a low viscosity, and a high application solids.

The nanocellulose, component (b) useful in the present invention, can include one or more compounds, including, but not limited to, hydrophilic nanofibrils, lignin-modified hydrophobic nanofibrils, nanocrystals, and mixtures thereof. The nanocellulose can be added to, and mixed with, the aqueous acrylic emulsion component (a) to form the WAC followed by an optional crosslinker component (c).

Exemplary of some of the commercial nanocellulose compounds useful in the present invention can include, for example, a hydrophilic nanocrystal such as BioPlus™ Nanocrystal (available from American Process); a hydrophilic nanofibril such as BioPlus™ Nanofibril (available from American Process); Nanofibril (available from American Process) and mixtures thereof.

The amount of nanocellulose used in the present invention process is, for example, from 0.25 weight percent (wt %) to 15 wt % in one general embodiment, from 0.5 wt % to 10 wt % in another embodiment and from 1 wt % to 7 wt % in still another embodiment, based on a total dry weight of adhesive composition.

In some embodiments, an isocyanate crosslinker can be added to the aqueous component. In some embodiments, the isocyanate crosslinker has two or more isocyanate groups per molecule. In some embodiments, the isocyanate crosslinker has three or more isocyanate groups per molecule. In some embodiments, the isocyanate crosslinkers are trimers of monomeric diisocyanates.

In some embodiments, the monomeric diisocyanates for use in making the isocyanate crosslinker are monomeric aliphatic diisocyanates. Suitable examples of the monomeric aliphatic diisocyanates include, but are not limited to, 1,6-hexamethylene diisocyanate ("HDI"), 1-isocyanato-3-isocyanatomethyl-3,5,5-trimethyl-cyclohexane ("IPDI"), 4,4'-diisocyanato dicyclohexylmethane (H12MDI), di-isocyanatomethyl-cyclohexane ("ADI"), and any combination thereof. The monomeric aromatic diisocyanates described above may be optionally used in the preparation of the polyisocyanate crosslinker.

Exemplary of some of the commercial products of aliphatic-based crosslinker component useful in the present invention include, for example, CR9-101, available from The Dow Chemical Company; Desmodur N 3200, Bayhydur 302 and Desmodur Quix 175, available from The Covestro Company; and mixtures thereof.

The amount of the isocyanate crosslinker is, for example, from 0.1 wt % to 10 wt % in one embodiment, from 0.5 wt % to 7 wt % in another embodiment and from 1 wt % to 5 wt % in still another embodiment, based on the total weight amount of the components in the adhesive composition, including Components A and B.

In some embodiments, the WAC of the present invention can include one or more optional additives including but are not limited to, for example, tackifiers, plasticizers, rheology modifiers, adhesion promoters, antioxidants, fillers, colorants, surfactants, and combinations of two or more thereof.

The amount of the other optional components, when used in the present invention, can be, for example, from 0 wt % to 10 wt % in one embodiment, from 0.01 wt % to 5 wt % in another embodiment and from 0.1 wt % to 3 wt % in still another embodiment.

In one broad embodiment, the WAC of the present invention for producing a laminate is prepared by thoroughly mixing, admixing or blending a predetermined amount of (a) an aqueous acrylic emulsion-based component; (b) at least one nanocellulose component dispersed in water; and (c) optionally, at least one crosslinker component, or any other optional ingredients or additives, if desired. The components above forming the WAC mixture are mixed together under process conditions such that the above components are thoroughly mixed together to form a uniform and homogeneous WAC. The ingredients that making up the WAC may be mixed together by any known adhesive mixing process and equipment such as an impingent mixer.

Once the WAC is made according to the process described above, a laminate structure is made from the resultant WAC; and the laminate structure, in turn, is used to make a laminate article or product such as a package for packaging food substances. Some of the advantageous properties exhibited by the resulting WAC produced according to the above-described process, can include, for example, the WAC has: (1) has a strong bond adhesion performance to films (i.e., the resulting WAC provides a good seal strength); (2) provides a laminate with good barrier properties.

In a broad embodiment, the laminate structure of the present invention includes the combination of at least two film layer substrates which are adhered or bonded together by an adhesive layer formed using the WAC of the present invention and disposed inbetween the two substrates. For example, the laminate structure includes: (i) a first film substrate layer; (ii) a second film substrate layer; and (iii) a layer of the WAC described above for binding the layers (i) and (ii). One or more other optional film substrates layers can be used to produce a multilayer laminate structure, if desired.

The first layer, component (i), of the present invention laminate product can be made of one or more materials, including, for example, polyethylene, polypropylene, polyethylene terephthalate, polyamide, polystyrene, cycloolefin copolymer, polyvinyl chloride, styrene butadiene, and the like. In one preferred embodiment, the material of the first layer useful in the present invention can be polypropylene, metalized polypropylene, polyethylene, and combinations thereof. Exemplary of some of the commercial materials useful in the first layer of the present invention can include, for example, biaxial oriented polypropylene (available from FILMTECH, INC.); metalized oriented polypropylene (available from FILMTECH, INC.), polyethylene (available from Berry Plastics); and mixtures thereof. In another preferred embodiment, the first film layer can be made of, for example, polypropylene having a density of from 0.89 grams per cubic centimeter (g/cc) to 0.92 g/cc.

The thickness of the first layer used in the present invention laminate product is, for example, from 10 μm to 200 μm in one embodiment, from 15 μm to 150 μm in another embodiment and from 20 μm to 125 μm in still another embodiment.

As aforementioned, in one embodiment, the second layer, component (ii), of the present invention laminate product can be made of the same material as the first layer; and consequently, the resulting multilayer laminate has the advantage of being more easily recyclable. In another embodiment, the second layer can be made of one or more materials different from the first layer.

When the second layer of the laminate product is made of a different polymer from the first layer, the second layer can include, for example, polyethylene, polypropylene, polyethylene terephthalate, polyamide, polystyrene, cycloolefin copolymer, polyvinyl chloride, styrene butadiene, and mixtures thereof. In one preferred embodiment, the material of the second layer useful in the present invention can be polyethylene, metalized polypropylene, polypropylene, and mixtures thereof. Exemplary of some of the commercial materials useful in the second layer of the present invention can include, for example, polyethylene (available from Berry Plastics); and biaxial oriented polypropylene and metalized polypropylene (available from FILMTECH, INC.); and mixtures thereof. In another preferred embodiment, the second film layer, when different from the first layer, can be made of, for example, polyethylene having a density of from 0.915 g/cc to 0.967 g/cc.

The thickness of the second layer used in the present invention film is, for example, from 10 µm to 200 µm in one embodiment, from 15 µm to 150 µm in another embodiment and from 20 µm to 125 µm in still another embodiment.

The WAC layer of the present invention used to bind the first and second film substrate layers is described above. In some embodiments, the thickness of the WAC layer can be, for example, from 0.5 µm to 8 µm in one embodiment, from 1 µm to 6 µm in another embodiment and from 1 µm to 4 µm in still another embodiment.

In one general embodiment, a process for producing the multilayer laminate product described above includes the steps of: (I) applying the adhesive composition of the present invention to at least a portion of the surface of the first layer and/or the second layer; (II) contacting the first layer and the second layer such that the adhesive is disposed inbetween the first layer and the second layer; and (III) curing the adhesive to form a multi-layer laminate product comprising the first layer bonded to the second layer via the cured adhesive.

In a preferred embodiment, the process for making the multi-layer laminate structure includes the steps of: (I) providing at least a first substrate; (II) providing at least a second substrate; (III) providing a waterborne laminating adhesive composition of the present invention; (IV) applying a coating layer of the waterborne laminating adhesive composition of the present invention to at least a portion of one surface of the first substrate or the second substrate to form a coating film layer of the waterborne laminating adhesive composition on the surface of first substrate or the second substrate; (V) bringing the first substrate into contact with the second substrate coated layer such that the coating film layer of the waterborne laminating adhesive composition is disposed inbetween the first and second substrates and forming a layered laminate structure; and (VI) curing the adhesive formulation in between the first and second substrates to attach, via the cured adhesive layer, the first substrate to the second substrate such that a bonded multi-layer laminate structure is formed.

The laminate film structure of the present invention includes films made from polymers bonded together using a barrier adhesive composition in place of a standard conventional adhesive composition; and the laminate film structure of the present invention still achieves similar or enhanced barrier properties compared to laminates containing a standard conventional adhesive composition. One of the advantageous properties exhibited by the laminate product made by the above process of the present invention can include, for example, a laminate having an improved oxygen transmission rate (OTR), i.e., a reduced OTR.

Because a laminate film structure can be designed with various layer materials, number of layers, film thicknesses and other properties, the OTR of a particular laminate structure will depend on, for example, the various properties of the first and second layers. As an illustration, and not to be limited thereby, the OTR of the laminate structure of the present invention is generally 10% less than a laminate made using a standard adhesive composition having no nanocellulose additive in the standard adhesive in one embodiment, 15% less than a laminate made using the standard adhesive composition having no nanocellulose additive in another embodiment, 25% less than a laminate made using the standard adhesive composition having no nanocellulose additive in still another embodiment, and 50% less than a laminate made using the standard adhesive composition having no nanocellulose additive in yet another embodiment. In even still another embodiment, the OTR of the laminate structure of the present invention is from 10% to 90% less than a laminate made using the standard adhesive composition containing no amount of a nanocellulose additive present in the standard adhesive composition.

The laminate prepared as described above can be used, for example, in flexible packaging applications; and in home and personal care applications. In one preferred embodiment, the laminate is used to make a multilayer laminate structure product or article such as a package, pouch or container for packaging food. In a preferred embodiment, the laminate is made of two layers of polymeric film with an adhesive layer disposed inbetween the two film layers bonding the two polymer films together. The process of making an article such as a food packaging article can be carried out by those skilled in the art of food packaging manufacturing.

As described above, there is a reduction in the permeability of oxygen through the laminate structures by using the barrier adhesive layer of the present invention in place of standard adhesives; and therefore, an article which is made using the laminate described above will have the same (maintain) or increased gas barrier properties compared to a laminate with a standard conventional adhesive composition. For example, an improvement (i.e., a reduction) in OTR exhibited by the laminate of the present invention described above will, in turn, impart the same improvement in OTR exhibited by the laminate to the final article made from the laminate.

In addition, a multilayer laminate having an "ABA" structure can advantageously be a simple, readily manufacturable structure and can also beneficially be recyclable such that the food packaging made from the laminate is environmentally friendly. An ABA laminate structure is a multilayer laminate wherein "A" is a polymer film layer and "B" is the barrier adhesive layer of the present invention. The ABA structure has two polymer film layers, A, that are the same.

The multilayer laminate structure produced according to the above described process, exhibits several advantageous properties including, for example, enhanced barrier properties, in particular an oxygen barrier property measured in terms of a OTR and/or a water vapor barrier property measured in terms of water vapor transmission rate (WVTR). For example, as described above, the OTR of a particular laminate structure will depend on, for example, the various properties of the first and second layers. As an illustration, and not to be limited thereby, the OTR of the laminate structure of the present invention is generally 10% less than a laminate made using a standard adhesive composition having no nanocellulose additive in the standard adhesive in one embodiment, 15% less than a laminate made using the standard adhesive composition in another embodiment, 25% less than a laminate made using the standard adhesive composition in still another embodiment, and 50% less than a laminate made using the standard adhesive composition in yet another embodiment. In even still another embodiment, the OTR of the laminate structure of the present invention is from 10% to 90% less than a laminate made using the standard adhesive composition containing no amount of a nanocellulose additive present in the standard adhesive formulation.

The WVTR property of the laminate structure, will also depend on, for example, the various properties of the first and second layers. As an illustration, and not to be limited thereby, the WVTR of the laminate structure of the present invention is generally 10% less than a laminate made using a standard adhesive composition that does not contain a nanocellulose additive in the standard adhesive in one embodiment, 15% less than a laminate made using the standard adhesive composition having no nanocellulose additive in another embodiment, 25% less than a laminate made using the standard adhesive composition having no nanocellulose additive in still another embodiment, and 50% less than a laminate made using the standard adhesive composition having no nanocellulose additive in yet another embodiment. In even still another embodiment, the WVTR of the laminate structure of the present invention is from 10% to 90% less than a laminate made using the standard adhesive composition containing no amount of a nanocellulose additive present in the standard adhesive composition.

The WAC of the present invention is used for producing a multilayer laminate, and in turn, the laminate is used to manufacture a product or article, and particularly an article which can benefit from having enhanced barrier properties. For example, the laminate can be used in packaging applications to form a pouch, a sachet, a stand-up pouch, or other bag member or container, and in particular a container which is used for packaging foods. The laminate prepared as described above can be used for other applications, for example, in flexible packaging applications; and in home and personal care applications

EXAMPLES

The following examples are presented to further illustrate the present invention in detail but are not to be construed as limiting the scope of the claims. Unless otherwise indicated, all parts and percentages are by weight.

Various materials used in the Inventive Examples (Inv. Ex.) and the Comparative Examples (Comp. Ex.), which follow, are explained in Table I.

before pouring the resultant mixture into an adhesive pan of a laminator.

Example 2

In this Inv. Ex. 2, 30 parts of BioPlus™ Nanofibril compound was firstly added to 70 parts of ROBOND™ L330 compound; and then, the two compounds were mixed using the same mixer and procedure described in Inv. Ex. 1.

Example 3

In this Inv. Ex. 3, 10 parts of BioPlus™ L Nanofibril compound was firstly added to 90 parts of ROBOND™ L330 compound; and then, the two compounds were mixed using the same mixer and procedure described in Inv. Ex. 1.

Example 4

In this Inv. Ex. 4, 20 parts of BioPlus™ Nanocrystal compound was firstly added to 80 parts of ROBOND™ L330 compound; and then, the two compounds were mixed using the same mixer and procedure described in Inv. Ex. 1.

Comparative Example A

In this Comp. Ex. A, 2 parts of CR 9-101 compound was slowly added to 100 parts of ROBOND™ L330 compound; and then, the two compounds were mixed using a mechanical mixer for 30 min before pouring the resultant mixture into an adhesive pan of a laminator.

Table II describes the adhesive formulations used in the above Examples 1-4 and Comparative Example A.

TABLE I

Adhesive Formulation Raw Materials

| Ingredient | Brief Description of Ingredient | Supplier of Ingredient |
|---|---|---|
| ROBOND ™ L330 | An acrylic emulsion containing 45% solids | The Dow Chemical Company (Dow) |
| CR 9-101 | A water-dispersible polyisocyanate based on hexamethylene diisocyanate (HDI) containing 100% solids | Dow |
| BioPlus ™ Nanocrystal | Hydrophilic nanocrystals (CNC) dispersed in water containing 2% solids: wherein the nanocrystals are 4-5 nm in width and 50-500 nm in length | American Process |
| BioPlus ™ Nanofibril | Hydrophilic nanofibrils (CNF) dispersed in water containing 2.9% solids: wherein the nanofibrils are 5-20 nm in width and 500 nm to several microns in length | American Process |
| BioPlus ™ L-Nanofibril | Lignin-modified hydrophobic nanofibrils (CNFL) dispersed in water containing 2.4% solids: wherein the nanofibrils are 5-20 nm in width and 500 nm to several microns in length | American Process |

Production of Adhesives

Example 1

In this Inv. Ex. 1, 10 parts of BioPlus™ Nanofibril compound was firstly added to 90 parts of ROBOND™ L330 compound; and then, the two compounds were mixed using a mixer, a FlackTek High Speed Mixer, for 3 minutes (min) at about 3,000 revolutions per minute (rpm). Later, 2 parts of CR 9-101 was slowly added to the mixture of ROBOND™ L330 and BioPlus™ Nanofibril; and then the mixture were mixed using a mechanical mixer for 30 min

TABLE II

Adhesive Compositions

| | Formulation (parts) | | | | |
|---|---|---|---|---|---|
| Ingredient | Inv. Ex. 1 | Inv. Ex. 2 | Inv. Ex. 3 | Inv. Ex. 4 | Comp. Ex. A |
| ROBOND ™ L 330 | 90 | 70 | 90 | 80 | 100 |
| BioPlus ™ Nanofibril | 10 | 30 | | | |
| BioPlus ™ L Nanofibril | | | 10 | | |
| BioPlus ™ Nanocrystal | | | | 20 | |
| CR 9-101 | 2 | 2 | 2 | 2 | 2 |

Production of Laminate Structures

The first and second film substrates used for preparing the laminate structures in the Examples and Comparative Examples included: BOPP as the first substrate and a metallized BOPP as the second substrate (BOPP/Metallized BOPP).

Example 5

In this Inv. Ex. 5, BOPP and Metallized BOPP films and the water-based adhesive prepared in Inv. Ex. 1, were used to produce laminate structures. A Nordmeccanica Labo Combi 400 pilot size coater was used at room temperature to produce the laminates. The films were corona treated before lamination. The temperature of the nip used in the lamination process and coater was 160° F. (71° C.). The lamination process and coater included three drying zones; and the drying temperatures of the three drying zones used in the lamination process were 160° F. (71° C.), 170° F. (77° C.), and 180° F. (82° C.), respectively. The resulting BOPP/Metallized BOPP laminate structures were evaluated to ensure performance of the adhesives across common laminate structures. Coat weight was maintained at about 2.35 pounds per ream (lbs/ream) (3.8 grams per square meter [$g/m^2$]). The produced laminate structures were subsequently cured in a controlled environment, for example, at 25° C. and 50% relative humidity (RH).

Example 6

In this Inv. Ex. 6, BOPP and Metallized BOPP films and the water-based adhesive prepared in Inv. Ex. 2, were used to produce laminate structures following the same procedure as described in Inv. Ex. 5 except that the coat weight was maintained at about 2.30 lbs/ream (3.7 $g/m^2$).

Example 7

In this Inv. Ex. 7, BOPP and Metallized BOPP films and the water-based adhesive prepared in Inv. Ex. 3, were used to produce laminate structures following the same procedure as described in Inv. Ex. 5 except that the coat weight was maintained at about 2.20 lbs/ream (3.6 $g/m^2$).

Example 8

In this Inv. Ex. 8, BOPP and Metallized BOPP films and the water-based adhesive prepared in Inv. Ex. 4, were used to produce laminate structures following the same procedure as described in Inv. Ex. 5 except that the coat weight was maintained at about 1.9 lbs/ream (3.1 g/ream).

Comparative Example B

In this Comp. Ex. B, laminate structures were produced using BOPP and Metallized BOPP films and the water-based adhesive prepared in Comp. Ex. A. The laminates were produced following the same procedure as described in Inv. Ex. 5 except that the coat weight was maintained at about 2.60 lbs/ream (4.2 $g/m^2$).

Laminate Testing

Oxygen Transmission Rate (OTR) Measurements

An oxygen transmission rate (OTR) of the formed laminate was measured using a MOCON OXTRAN 2/21 under ASTM method D3985 ("Standard Test Method for Oxygen Gas Transmission Rate through a Plastic Film and Sheeting Using a Coulometric Sensor"). The OTR data is reported in the standard unit of cubic centimeters of oxygen per square meter per day, "$ccO_2/(m^2\text{-day})$". The conditions used for testing to obtain OTR measurements were 23° C. and 85% relative humidity (RH).

Water Vapor Transmission Rate (WVTR) Measurements

A water vapor transmission rate (WVTR) of the film laminate test sample is measured using a WVTR test cell as follows: A test film sample is secured across an orifice of the test cell forming a contiguous boundary and creating an inside chamber and outside chamber of the test cell. A dry nitrogen ($N_2$) flow stream is fed into the inside chamber of the test cell via a feed opening in the test cell. The dry $N_2$ flow stream contacts the inside surface of the test film sample facing the inside chamber. Simultaneously, a water vapor flow stream is fed into the outside chamber of the test cell via a feed opening in the test cell. The water vapor flow stream contacts the opposite surface (outside surface) of the test film sample facing the outside chamber of the test cell. Any moisture from the water vapor flow stream that passes through the film sample wets the dry $N_2$; and then any moist $N_2$ in the inside chamber of the test cell leaves the inside chamber via an exit opening in the test cell. Any moisture from the water vapor flow stream that does not pass through the film sample leaves the outside chamber of the test cell via an exit opening in the outside chamber.

The moist $N_2$ leaving the inside chamber of the test cell flows to a sensor wherein the amount of moisture is measured in terms of WVTR and recorded.

Table III describes the barrier performance results of laminate structures obtain in the above-described Inventive Examples (test samples having the adhesive composition of the present invention) and laminate structures obtain in the above-described Comparative Examples (test samples having a conventional adhesive composition).

TABLE III

Laminate Barrier Performance

| Adhesive Example No. | Description of Adhesive | OTR $ccO_2/[m^2\text{-day}]$ | WVTR ($gH_2O/m^2/day$) |
|---|---|---|---|
| Inv. Ex. 4 | Waterborne adhesive containing cellulose nanofibril of Inv. Ex. 1. | 47 | 0.69 |
| Inv. Ex. 5 | Waterborne adhesive containing cellulose nanofibril of Inv. Ex. 2. | 44 | 0.63 |
| Inv. Ex. 6 | Waterborne adhesive containing lignin modified cellulose nanofibril of Inv. Ex. 3. | 51 | 0.51 |
| Inv. Ex. 7 | Waterborne adhesive containing cellulose nanocrystal of Inv. Ex. 4. | 43 | 0.63 |

TABLE III-continued

Laminate Barrier Performance

| Adhesive Example No. | Description of Adhesive | OTR ccO$_2$/[m$^2$-day] | WVTR (gH$_2$O/m$^2$/day) |
|---|---|---|---|
| Comp. Ex. B | Waterborne adhesive of Comp. Ex. A. not containing a nanocellulose additive. | 75 | 0.77 |

From the data described in Table III above, it can be seen that the waterborne adhesive formulation of Inv. Ex. 1-4 containing nanocellulose showed improved OTR and WVTR barrier performance for a laminate structure versus the waterborne adhesive formulation of Comp. Ex. A, which did not include a nanocellulose additive.

What is claimed is:

1. A waterborne laminating barrier adhesive composition comprising:
    (a) a water-based acrylic polymer emulsion component having a Tg of above −20° C.;
    (b) at least one nanocellulose component comprising fibers and/or crystals having a length/width ratio of from 10 to 1,000; and
    (c) optionally, at least one isocyanate crosslinker component.

2. The waterborne laminating barrier adhesive composition of claim 1, wherein the water-based acrylic polymer emulsion component is prepared from free radical polymerization of at least one acrylic monomer in water; wherein the monomer is selected from the group consisting of vinyl acetate, methyl acrylate, methyl methacrylate, butyl acrylate, ethyl acrylate, acrylic acid, methacrylic acid, hydroxyethyl acrylate, hydroxypropyl acrylate, N-hydroxymethyl acrylamide, 2-ethylhexyl acrylate, styrene, and mixtures thereof.

3. The waterborne laminating barrier adhesive composition of claim 1, wherein the at least one nanocellulose component is selected from the group consisting of hydrophilic nanofibrils, lignin-modified hydrophobic nanofibrils, nanocrystals, and mixtures thereof.

4. The waterborne laminating barrier adhesive composition of claim 1, further includes the at least one isocyanate crosslinker component, the at least one isocyanate crosslinker component having two or more isocyanate groups per molecule.

5. A process for making a multi-layer laminate structure comprising the steps of:
    (I) providing a first substrate;
    (II) providing a second substrate;
    (III) providing the waterborne laminating barrier adhesive composition of claim 1;
    (IV) applying the waterborne laminating barrier adhesive composition of claim 1 to at least a portion of one surface of the second substrate to form a coating film layer of the waterborne laminating barrier adhesive composition;
    (V) bringing the first substrate into contact with the coating film layer such that the coating film layer of the waterborne laminating barrier adhesive composition is disposed in between the first substrate and the second substrate to form a layered laminate structure; and
    (VI) curing the waterborne laminating barrier adhesive composition in between the first substrate and the second substrate to attach, via the cured waterborne laminating barrier adhesive composition, the first substrate to the second substrate, such that the multi-layer laminate structure is formed.

6. A multilayer laminate structure comprising:
    (i) a first substrate layer;
    (ii) a second substrate layer; and
    (iii) a layer of the waterborne laminating barrier adhesive composition of claim 1 disposed in between the first substrate layer and the second substrate layer; wherein the waterborne laminating barrier adhesive composition is cured to bond the first substrate layer to the second substrate layer.

7. The multilayer laminate structure of claim 6, wherein a barrier performance of the multilayer laminate structure is an oxygen transmission rate of from 10% to 90% less compared to a laminate made using a standard adhesive composition.

8. The multilayer laminate structure of claim 6, wherein a barrier performance of the multilayer laminate structure is a water vapor transmission rate of from 10% to 90% less compared to a laminate made using a standard adhesive composition.

9. A packaging article comprising the multilayer laminate structure of claim 6.

10. A process of making a waterborne adhesive composition comprising admixing:
    (a) a water-based acrylic polymer emulsion component having a Tg of above −20° C.;
    (b) at least one nanocellulose component comprising fibers and/or crystals having a length/width ratio of from 10 to 1,000; and
    (c) optionally, at least one isocyanate crosslinker component.

* * * * *